(12) United States Patent
Lin et al.

(10) Patent No.: US 8,498,341 B2
(45) Date of Patent: Jul. 30, 2013

(54) DECODER AND OPERATION METHOD THEREOF

(75) Inventors: Po-Ting Lin, Tainan County (TW); Shih-Ta Hsu, Tainan County (TW)

(73) Assignee: Himax Technologies Limited, Tainan (TW)

( * ) Notice: Subject to any disclaimer, the term of this patent is extended or adjusted under 35 U.S.C. 154(b) by 1353 days.

(21) Appl. No.: 11/861,816

(22) Filed: Sep. 26, 2007

(65) Prior Publication Data

US 2009/0043787 A1 Feb. 12, 2009

(30) Foreign Application Priority Data

Aug. 7, 2007 (TW) .............................. 96128998 A

(51) Int. Cl.
*H04B 1/66* (2006.01)
(52) U.S. Cl.
USPC ................................. 375/240.25; 375/240.29
(58) Field of Classification Search
USPC ....................................... 375/240.25, 240.29
See application file for complete search history.

(56) References Cited

U.S. PATENT DOCUMENTS

| | | | | |
|---|---|---|---|---|
| 6,940,873 | B2* | 9/2005 | Boyle et al. | 370/503 |
| 7,594,254 | B2* | 9/2009 | Parnell et al. | 725/146 |
| 2004/0190513 | A1* | 9/2004 | Hakkarainen et al. | 370/389 |
| 2005/0265337 | A1* | 12/2005 | Tomizawa | 370/389 |
| 2006/0136976 | A1* | 6/2006 | Coupe et al. | 725/131 |
| 2007/0286194 | A1* | 12/2007 | Shavitt et al. | 370/392 |
| 2008/0056682 | A1* | 3/2008 | Minnick et al. | 386/112 |

FOREIGN PATENT DOCUMENTS

CN 1581964 2/2005

* cited by examiner

*Primary Examiner* — Jason Mattis
(74) *Attorney, Agent, or Firm* — J.C. Patents

(57) ABSTRACT

A decoder and an operation method thereof are provided. The decoder includes a pre-unit, a database, a data filter, and a scheduler. The pre-unit provides packet information of a data stream. The database records a plurality of parameter sets. The scheduler fetches the corresponding parameter sets from the database according to the packet information, and saves the parameter sets into the data filter. The data filter compares the data stream with the saved parameter sets and outputs a comparing result. Therefore, the present invention reduces the cost of the decoder.

6 Claims, 4 Drawing Sheets

DECODER AND OPERATION METHOD THEREOF

CROSS-REFERENCE TO RELATED APPLICATION

This application claims the priority benefit of Taiwan application serial no. 96128998, filed on Aug. 7, 2007. All disclosure of the Taiwan application is incorporated herein by reference.

BACKGROUND OF THE INVENTION

1. Field of the Invention

The present invention relates to an encoder, and more particularly, the present invention relates to an expansion encoder.

2. Description of Related Art

With the development of multimedia technology, digital televisions (DTVs) are capable of providing high definition image quality and preferred surround sound effect compared with conventional televisions. Moreover, the DTVs adopt digital signal transmission and compression, thus effectively utilize the bandwidth and reduce the noise interference from the outside. In terms of the processing of digital signal, the MPEG-2 encoding standard defines two data stream forms, namely, program stream (PS) and transport stream (TS).

FIG. 1A is a schematic view of a PS. Referring to FIG. 1A, the PS 100 is composed of one or more streams (e.g., streams 110, 120) containing packetized elementary stream (PES) packets taking a common time base as reference. For example, the stream 120 includes video PES packets 122 to 124, an audio PES packet 125, and a data PES packet 126, as well a header 121. The PS is deigned to be transmitted in an error-free environment and is adapted to an application of interactive multimedia. The elementary stream (ES) is an audio, a video, and a single signal (usually, a compressed signal) output by a data encoder, which becomes PES after being packetized.

FIG. 1B is a schematic view of a TS. Referring to FIG. 1B, the TS 130 is a combination of fixed-sized transport packets and the transport packets of one or more program, in which fixed-sized transport packets are formed by separating the PES packets. For example, the TS 130 includes a video transport packet 131, an audio transport packet 132, a private data transport packet 133, a service information transport packet 134, and a null transport packet 135, and so on. Each of the transport packets has a header at the front end. The PES packet constituting the elementary stream of a program takes the common time base as reference, so the transport packets in the TS can make reference to different time bases.

The data stream in the forms of PS and TS is constructed by an emitter defined by MPEG-2, so a decoder must be designed correspondingly at a receiving end to separate and decode the packets and save the packets into corresponding memory blocks. FIG. 2 is an architecture diagram of a conventional decoder. Referring to FIG. 2, a decoder 200 includes a pre-unit 210 and a plurality of data filters 220. The pre-unit 210 receives the data stream in the form of PS and TS of the emitter 250 and provides the data stream containing various transport packets to the data filters 220.

A pattern is saved in a memory of the data filters 220 to be compared with the data stream, so as to filter out desired information. The data filters 220 then save the filtered information into a system memory 230. Next, a processor 240 accesses the system memory 230 according to the requirements. Those skilled in the art would appreciate that if the number of the data filters 220 is M (M is a positive integer), the decoder 200 may save M types of patterns at most. However, if the data stream has more than M types of data, the data filters 220 cannot filter out all the desired information.

In view of the above, the conventional art adds the number of the data filters 220 to solve the above problem. However, the hardware cost is also increased.

SUMMARY OF THE INVENTION

Accordingly, an objective of the present invention is to a low cost decoder.

The present invention provides an operation method of a decoder for improving the expandability.

In order to solve the above problems, the present invention provides a decoder, which includes a pre-unit, a database, a data filter, and a scheduler. The pre-unit provides packet information of a data stream. The database records a plurality of setting parameter sets. The data filter compares the data stream with saved operation parameter sets and outputs a comparing result. The scheduler is coupled to the pre-unit, the database, and the data filter, and fetches a corresponding setting parameter set from the database according to the packet information provided by the pre-unit, and saves the fetched parameter set into the data filter as an operation parameter set.

In an embodiment of the present invention, the packet information of a data stream includes a packet identification. In another embodiment, the operation parameter set includes a pattern, and the pattern includes a mask and a control parameter. In still another embodiment, the database includes a memory and a memory controller. The memory saves the setting parameter sets therein. The memory controller reads a corresponding setting parameter set from the memory under the control of the scheduler and transmits the fetched setting parameter set to the scheduler. In yet another embodiment, the memory includes a double date rate (DDR) memory.

The present invention provides an operation method of a decoder, which includes the following steps. A packet information is extracted from a data stream. Then, a database recording a plurality of setting parameter sets is provided. Further, a corresponding setting parameter set is fetched from the database according to the packet information. After that, the fetched setting parameter set is saved into the data filter as an operation parameter set, such that the data filter compares the data stream with the saved operation parameter sets and outputs a comparing result.

The present invention utilizes the database to record a plurality of setting parameter sets. Further, the scheduler selects an appropriate setting parameter set according to the packet information of a data stream and saves the selected setting parameter set into the data filter as an operation parameter set. The data filter compares the data stream with the saved operation parameter sets and outputs a comparing result. Compared to the conventional decoder, the present invention adds the setting parameter sets of the database to enable the data filter to filter out various data, thereby greatly improving the expandability of the setting parameter sets.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Before illustrating the embodiments of the present invention, first, the decoder of the present invention is assumed to, but not limited to, filter out a desired information from a TS, and may also be applied to a data stream in the form of PS and so on.

Figure 1A:
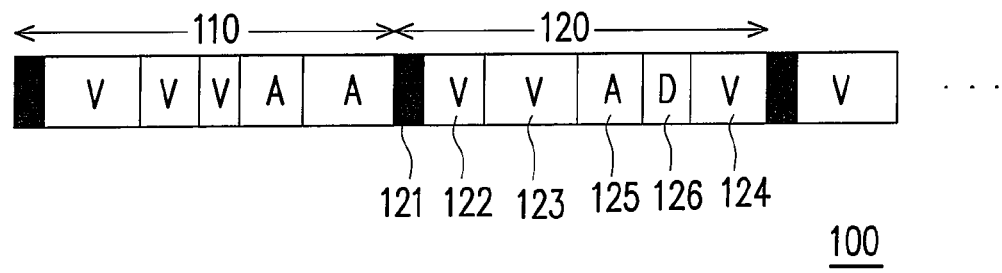
FIG. 1A is a schematic view of a PS.
Figure 1B:
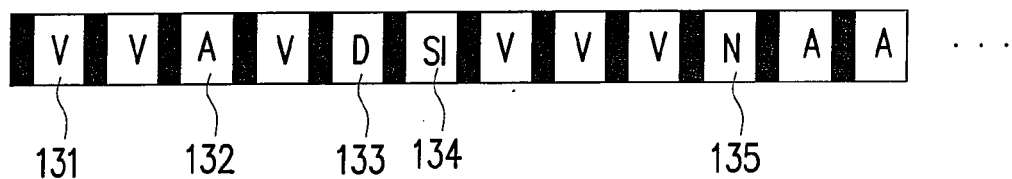
FIG. 1B is a schematic view of a TS.
Figure 2:
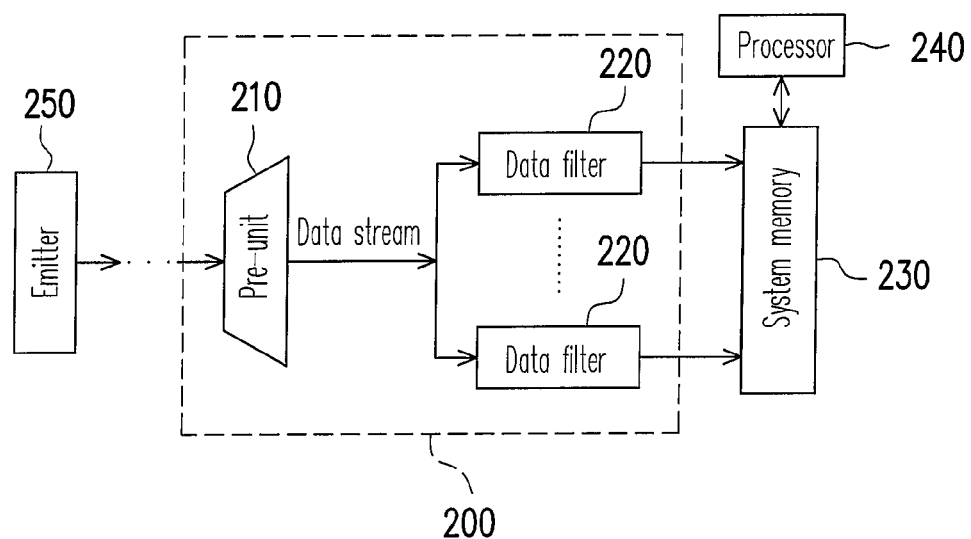
FIG. 2 is an architecture diagram of a conventional decoder.
Figure 3:
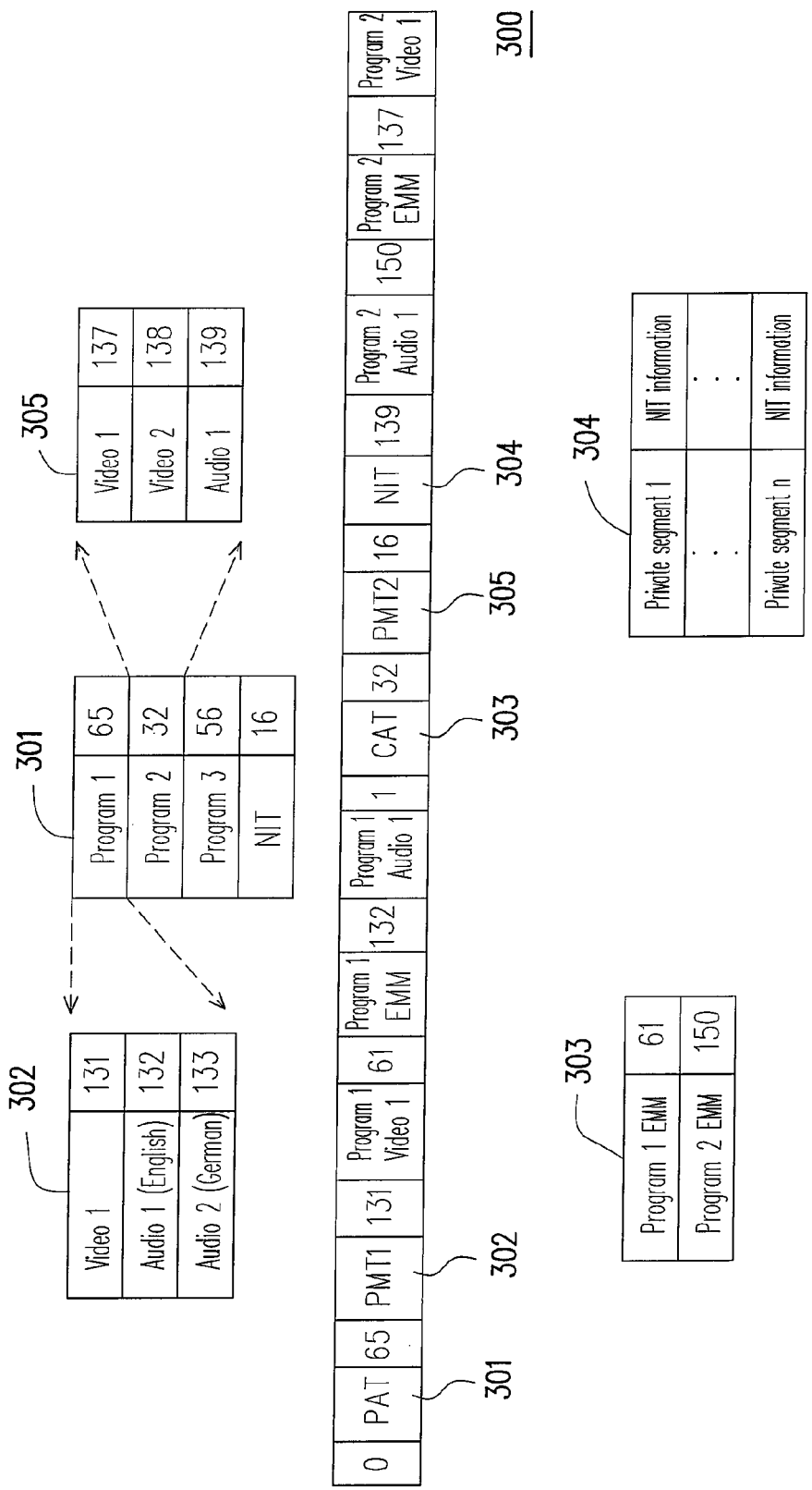
FIG. 3 is a schematic view of a TS.

FIG. 3 is a schematic view of a TS. Referring to FIG. 3, the TS 300 includes transport packets of video and audio of each program and determine the desired transport packet according to the packet identifier (PID). Generally speaking, the PID is disposed in the header of the transport packet. Therefore, in order to acquire the data of a specified program in the TS 300, and MPEG-2 encoding standard defines the so-called service information (SI).

In application of DTV, the service information mainly includes a program association table (PAT) 301, a program map table (PMT) 302, a conditional access table (CAT) 303, and a network information table 304. The program association table 301 (PID=0) records the PID of the program map table of each program in the TS 300, for example, the program map table 302 of program 1 in the transport packet PID=65, and a program map table 305 of program 2 in the transport packet PID=32. Further, the program association table 301 also records the PID of the network information table 304, for example, the network information table 304 in the transport packet PID=16.

The program map tables 302 and 305 are used to acquire the PIDs of the video and audio of the program. For example, the program map table 302 records a video 1 of program 1 in the transport packet PID=131, and an audio 1 (e.g., English) and an audio 2 (e.g., German) of program 1 respectively in the transport packets PID=132, PID=133. The program map table 305 records a video 1 and a video 2 of program 2 in the transport packets PID=137, PID=138 and an audio 1 of program 2 in the transport packet PID=139.

The network information table 304 is used to identify a plurality of TSs, so as to find the relevant TS. The conditional access table 303 (PID=1) records the entitlement management message (EMM) of each program to encrypt the transport packet. The EMM is a private conditional access information, and the private conditional access information specifies authorization levels or service of a specific decoder.

It can be known from the above illustration that the TS integrates a large amount of data to be processed. In order to reduce the amount of computation and the bandwidth demand, a decoder is required to compare data streams to filter out the desired information.

Figure 4:
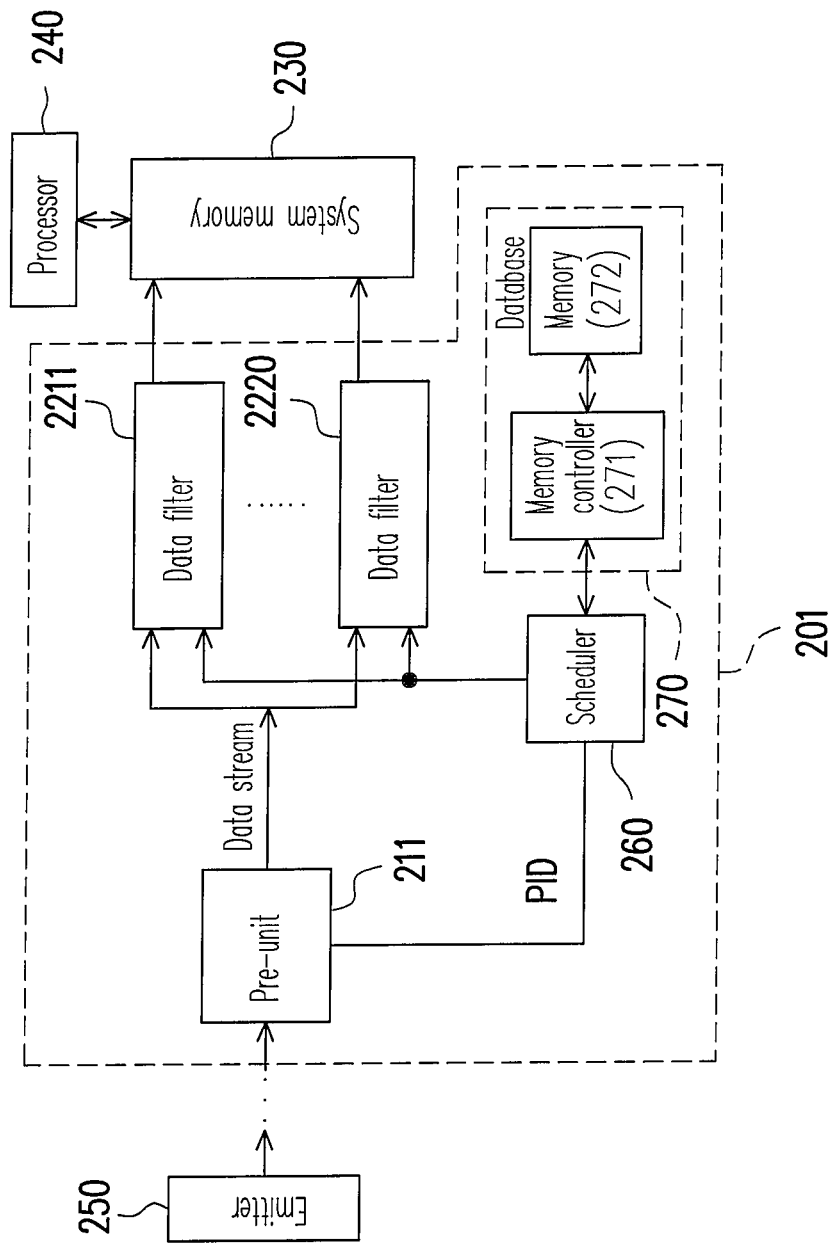
FIG. 4 is an architecture diagram of a decoder according to an embodiment of the present invention.

FIG. 4 is an architecture diagram of a decoder according to an embodiment of the present invention. Referring to FIG. 4, an emitter 250 constructs the encoded and packetized audio, videos, control data, and the service information packet into a data stream in the form of PS or TS, for facilitating the transmission in the channel. The receiving end may use a decoder 201 to separate the data stream into various packets, for example, the audio, video, control data, and service information packet. Further, the decoder 201 may also filter out the desired program information according to the saved parameter sets, so as to allow the user to view the specified program in real time. The parameter set is, for example, a pattern, and the pattern can include a mask and a control parameter. Then, the decoder 201 will be illustrated in more detail.

The decoder 201 includes a pre-unit 211, a database 270, data filters 2211 to 2220, and a scheduler 260. The pre-unit 211 may be, for example, a de-multiplexer for separating the data stream into various packets and provide the packet information. The database 270 records a plurality of setting parameter sets. In detail, for example, the database may be implemented by a memory 272 and a memory controller 271. The memory 272 is, for example, a double date rate memory for saving the setting parameter sets. The memory controller 271 reads the corresponding setting parameter sets from the memory 272 under the control of the scheduler 260 and transmits the fetched setting parameter sets to the scheduler 260.

Accordingly, data filters 2211 to 2220 compare the data stream with the saved operation parameter sets and output a comparing result. In this embodiment, the number of the data filter is, for example, but not limited to, 10, denoted by 2211 to 2220. The scheduler 201 is coupled to the pre-unit 211, the database 270, and the data filter 221. The scheduler 201 fetches the corresponding setting parameter sets from the database 270 according to the packet information provided by the pre-unit 211 and saves the fetched setting parameter sets into the data filters 2211 to 2220 as the operation parameter sets. The operation parameter is also called a pattern and the pattern includes, for example, a mask and a control parameter. Further illustration will be made with reference to the flow chart below.

Figure 5:
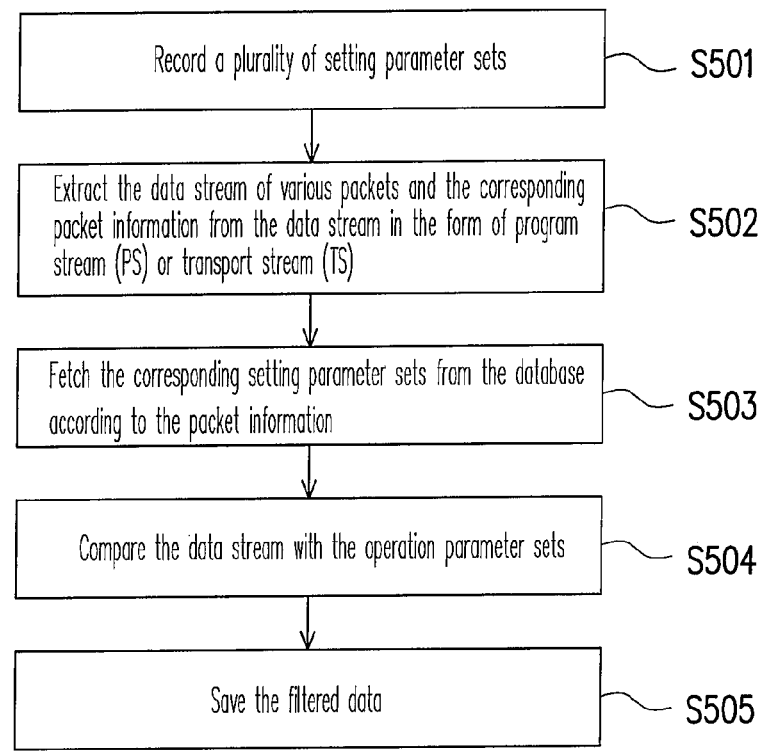
FIG. 5 is a flow chart of the operation method in FIG. 4.
Figure 6:
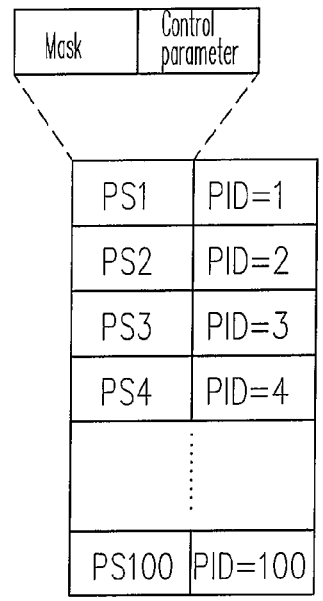
FIG. 6 is a schematic view of the setting parameter sets recorded in a database according to an embodiment of the present invention.

FIG. 5 is a flow chart of the operation method in FIG. 4. FIG. 6 is a schematic view of the setting parameter sets recorded in a database according to an embodiment of the present invention. Referring to FIGS. 4 to 6 together, first, in S501, a plurality of setting parameter sets is recorded in the memory 272 of the database 270 (as shown in FIG. 6). In this embodiment, the setting parameter sets in the memory 272 are, for example, but not limited to, 100 sets, denoted by PS1 to PS100, which are corresponding to PID1-PID100. Next, in S502, the pre-unit 211 extracts the data stream and corresponding PID of various packets from the data stream in the form of PS or TS of the emitter 250. For example, the pre-unit 211 extracts the video 1 of program 1 and the corresponding PID4 in a first period. When the pre-unit 211 pre-processes the program 1, the scheduler 260 acquires that a packet PID4 will appear in the data stream in advance from the PID (at this time, PID4) provided by the pre-unit 211.

Next, during a second period, the scheduler 260 fetches the corresponding setting parameter sets saved in the memory 272 through the memory controller 271 according to the PID provided by the pre-unit 211 and decides to write the fetched setting parameter sets into one of the data filters 2211 to 2220 to serve as the operation parameter sets of the data filter (S503). For example, if the PID provided by the pre-unit 211 is PID4, it is indicated that the packet PID4 will appear in the data stream. Further, the scheduler 260 fetches the setting parameter set PS4 corresponding to the PID4 from the memory 272 through the memory controller 271. Further, the scheduler 260 may also perform a scheduling algorithm to determine which one of the data filters 2211 to 2220 has the operation parameter sets with the minimum probability to be used, so as to write the fetched setting parameter set PS4 from the memory 272 into a data filter (e.g., the data filter 2220) with the minimum probability to be used. Therefore, the data filter 2220 uses the setting parameter set PS4 as the operation parameter set to filter out the packet PID4 from the data stream.

Afterwards, during a third period, after the pre-processing on the program 1 is done, the pre-unit 211 will transmit the processing result (i.e., the data stream of the video 1 of program 1) to the data filters 2211 to 2220. At this time, as the scheduler 260 has written the setting parameter set PS4 corresponding to the PID4 into the data filter 2220 in advance, when the packet PID4 appears in the data stream, the data filter 2220 compares the data stream of the video 1 of program 1 with the operation parameter set PS4 to accurately filter out the packet PID4 and output the comparing result to the system memory 230 (S504).

Then, during a fourth period, the system memory 230 saves the filtered data therein for the processor 240 to access, so that the processor 240 may perform a follow-up process on the program 1 (S505). Those skilled in the art would known that the pre-unit 211 continuously receive the data stream and extract various data streams and the corresponding PIDs.

For example, during the second period, the pre-unit 211, for example, extracts the audio 1 of program 1 and the corresponding PID48, transmits the PID48 to the scheduler 260 and transmits the audio 1 of program 1 to the data filter 2212. The PID48 may be first transmitted to the scheduler 260, and the audio 1 of program 1 will then be transmitted to the data filter 2212 after a period of time. During the third period, the scheduler 260 fetches the setting parameter set PS48 saved in the memory 272 according to the PID48 through the memory controller 271 and saves the setting parameter set PS48 into the data filter 2212 to serve as the operation parameter set PS48.

Accordingly, during the fourth period, when the data stream of the audio 1 of program 1 is transmitted to the data filter 2212, the data filter 2212 may compare the data stream of the audio 1 of program 1 with the operation parameter set PS48 to filter out the desired data and output the comparing result to the system memory 230. Thereafter, during the fifth period, the system memory 230 saves the filtered data therein for the processor 240 to access. Similarly, with the changes of the received data stream, the decoder 201 may repeat the above steps to dynamically change the operation parameter sets of the data filters 2211 to 2220, so as to filter out the desired data.

Those of ordinary skill in the art would easily understand that this embodiment utilizes the database to save the parameter sets required by the data filter, so the types of the data stream filtered by the data filter may be increased as long as additional parameter sets are added to the database. In this manner, the expandability of the parameter sets in the decoder can be greatly improved. Further, the data filter of this embodiment can use a low-cost register to replace the memory built in the conventional data filter. Therefore, the hardware cost of the decoder can be reduced.

According to another aspect, if the conventional decoder intends to filter out 100 types of data, 100 data filters respectively with different operation parameter sets saved therein are required. However, this embodiment only uses 10 (or less) data filters and saves 100 sets of parameter sets into the database to dynamically update the parameter sets of the data filter in real time, thereby achieving the effect similar to that of the conventional decoder, and greatly reducing the cost of the decoder.

It should be noted that, though a possible form of the decoder is described in the above embodiment, those of ordinary skill in the art would know that different manufacturers have different designs of decoders and operation steps, so the application of the present invention is not limited to this possible form. That is to say, the decoder, as long as selecting the setting parameter sets from a database according to the packet information of a data stream for the data filter to make comparison, is in conformity with spirit of the present invention.

In view of above, the embodiment of the present invention at least has the following advantages.

1. The expandability of the setting parameter sets is greatly improved by adding the setting parameter sets in the database.

2. The data filter utilizes a register to replace the memory used in the conventional data filter, thereby reducing the hardware cost of the decoder.

3. The parameter sets of the data filter may be updated by the scheduler and the parameter sets in the database in real time, such that the data filter can filter out the corresponding desired data according to the data stream.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A decoder, comprising:
    a pre-unit, for separating a data stream into various packets and providing each packet with a packet information, wherein each packet information corresponds to each packet and includes a packet identification;
    a database, for recording a plurality of setting parameter sets;
    at least one data filter, for comparing the data stream with a operation parameter set saved therein, and outputting a comparing result; and
    a scheduler, coupled to the pre-unit, the database, and the data filter, for fetching corresponding at least one setting parameter set from the database according to the packet identification of the packet information provided by the pre-unit and saving the setting parameter set fetched from the database into the data filter, which has a minimum probability to be used, as the operation parameter set, wherein the packet identification of each packet is first transmitted to the scheduler, and the setting parameter set corresponding to the packet identification is written into the data filter by the scheduler before each packet is transmitted to the data filter.

2. The decoder as claimed in claim 1, wherein the operation parameter set comprises a pattern, and the pattern comprises a mask and a control parameter.

3. The decoder as claimed in claim 1, wherein the database comprises:
    a memory, for storing the setting parameter sets; and
    a memory controller, for reading the corresponding at least one setting parameter sets from the memory under the control of the scheduler and delivering the setting parameter sets fetched from the memory to the scheduler.

4. The decoder as claimed in claim 3, wherein the memory comprises a double date rate (DDR) memory.

5. An operation method of a decoder, comprising:
extracting a packet information of a packet from a data stream, wherein the packet information corresponds to the packet and includes a packet identification;
providing a database, recording a plurality of setting parameter sets;
fetching at least one setting parameter set from the database according to the packet identification of the packet information; and
saving the setting parameter set fetched from the database into at least one data filter as an operation parameter set, such that the data filter compares the data stream with the operation parameter set saved in the data filter, which has a minimum probability to be used, and outputs a comparing result, wherein the setting parameter set corresponding to the packet identification is written into the data filter before each packet is transmitted to the data filter.

6. The operation method of a decoder as claimed in claim 5, wherein the operation parameter set comprises a pattern, and the pattern comprises a mask and a control parameter.

* * * * *